United States Patent [19]
Avesian et al.

[11] Patent Number: 5,941,509
[45] Date of Patent: Aug. 24, 1999

[54] CLAMP ASSEMBLY FOR AIR ACTUATOR

[75] Inventors: Jeffrey D. Avesian; Daniel J. Leonard, both of Carmel; Robert L. Hiday, Pendleton; Keith A. Stern, Anderson, all of Ind.

[73] Assignee: Bridgestone/Firestone, Inc., Akron, Ohio

[21] Appl. No.: 08/844,474

[22] Filed: Apr. 18, 1997

[51] Int. Cl.⁶ .................................................. F16F 9/04
[52] U.S. Cl. ..................................... 267/64.27; 267/64.24
[58] Field of Search ........................... 267/64.19, 64.23, 267/64.24, 64.27, 64.28

[56] References Cited

U.S. PATENT DOCUMENTS

| | | | |
|---|---|---|---|
| 4,718,650 | 1/1988 | Geno | 267/64.27 |
| 4,852,861 | 8/1989 | Harris | 267/64.27 |
| 4,899,995 | 2/1990 | Hoffman et al. | 267/64.27 |
| 4,946,144 | 8/1990 | Geno et al. | 267/64.27 |
| 5,374,037 | 12/1994 | Bledsoe | 267/64.27 |

FOREIGN PATENT DOCUMENTS 319448  6/1989  European Pat. Off. ............. 267/64.27

*Primary Examiner*—Robert J. Oberleitner
*Assistant Examiner*—Robert A. Siconolfi
*Attorney, Agent, or Firm*—D. A. Thomas

[57] ABSTRACT

An air actuator has a pair of axially spaced end members and an intervening elastomeric flexible sleeve extending therebetween which forms a fluid pressure chamber. An annular clamp ring having a smooth inner diameter coacts with an annular wall on the end cap having an outer diameter with annular indentations formed therein to clamp the ring on the end cap. The annular wall defines clamping surfaces in between and adjacent to the annular indentations. The annular indentations form a series of pinch areas with the intervening sleeve, which sealingly clamp the sleeve therebetween. The indentations receive portions of the sleeve and change the direction of reinforcing cords within the sleeve. The clamp ring abuts against a radially extending surface or shoulder of the end cap to reduce axial movement of the ring during operation of the air spring.

6 Claims, 2 Drawing Sheets

CLAMP ASSEMBLY FOR AIR ACTUATOR

BACKGROUND OF THE INVENTION

1. Technical Field

The invention relates to air actuators and more particularly to the clamping means adapted to affix a resilient elastomeric sleeve member to the relatively rigid end caps on each end of the air actuator. Specifically, the invention relates to a clamp assembly for an air actuator and/or air spring employing annular recesses or indentations in the end caps to form a series of pinch areas with the intervening sleeve which sealingly clamp the sleeve therebetween when clamping rings with smooth inner contact surfaces are crimped thereover.

2. Background Information

Pneumatic assemblies such as air actuators and springs, have been used for many years for various purposes. The air actuator usually consists of a flexible rubber sleeve or bellows containing a supply of compressed fluid and a feed for increasing or decreasing the compressed fluid therein. The flexible sleeve is formed of a flexible elastomeric material often containing reinforcing cords, where the flexibility of the material permits a first end cap to move axially with respect to another end cap secured within the ends of the sleeve as the amount of compressed fluid is changed. Since the air actuator is positioned in between a movable or actuatable object and typically a fixed object, the movable object moves in correlation to this axial movement.

As to pneumatic springs commonly referred to as air springs, the construction is similar with a flexible rubber sleeve or bellows containing a supply of compressible fluid. However, the air spring has one or more pistons movable with respect to the flexible sleeve. The piston causes compression and expansion of the fluid within the sleeve as the sleeve stretches or retracts, respectively, thereby absorbing shock loads and/or dampening vibrations. The flexible sleeve is formed of a flexible elastomeric material containing reinforcing cords and this permits the piston to move axially with respect to another piston or end cap secured within open ends of the sleeve. One application for air springs is with motor vehicles where the spring provides cushioning between moveable parts of the vehicle, primarily to absorb shock loads impressed on the vehicle axles by the wheels striking an object in the road or falling into a depression.

In either air actuators or air springs, the ends of the sleeves are sealingly connected to the opposed end caps, or the piston and opposite end cap, respectively, and are always one of the important and major aspects in producing an efficient and maintenance-free air actuator or spring. One problem with certain air actuators or springs is the ineffective sealing and/or clamping of the flexible sleeve to the end caps resulting in a lack of an air-tight seal.

Another problem with existing air actuators and springs is that the exposed cut edge at the end of the elastomeric sleeve of the air actuator or spring will engage the sleeve body as it rolls along the piston or end cap in excessive stroke conditions causing excess wear to the flexible sleeve.

Another problem with existing air actuators and springs is the inability to clamp and grip the flexible sleeve so as to accept high pressures within the fluid pressure chamber within the end-capped flexible sleeve.

Another problem with existing air actuators and springs is the inability to force or flow sufficient rubber from the sleeve into the grooves on either or both the clamp ring and end cap as is needed for sufficient clamping to occur.

Another problem with existing air actuators and springs is that failure of a component end seal at the sandwiching of the sleeve between the clamp ring and the end cap, or failure of an end cap or piston is typically the result when overpressure occurs and is less desirable versus a sidewall burst of the sleeve.

Another problem with existing air actuators and springs is ineffective holding by the pinch areas, that is the rubber forced into the grooves on either or both the clamp ring and end cap, as is needed for effective high pressure sealing.

Another problem with existing air actuators and springs, and in particular, the clamp ring therefore, is that the clamp ring will move in its clamped position under dynamic conditions causing movement of the clamped elastomeric material therebetween tending to loosen the sealing engagement and deteriorating the clamp integrity and causing ultimate leakage and failure. This ring movement is especially critical during the jounce or collapsing stroke.

Another problem with existing air actuators and springs and the clamping of the elastomeric sleeve ends to the piston member and/or end cap is to secure a sufficiently tight seal to be able to withstand high fluid pressures contained in the fluid chamber without premature leakage or bursting even upon experiencing severe air spring movement and being exposed to the harsh environments on the undercarriage of a vehicle.

Another problem with existing air actuators and springs and the clamping of the elastomeric sleeve ends to the piston member and/or end caps is the time consuming, labor intensive, and expensive process of creating grooves/indentations and/or projections in both the outer diameter of the end caps and/or pistons, and the clamping rings to assure the flexible rubber sleeve does not slide out from between the end caps and/or piston and the ring.

Some examples of air actuators and springs and the end sealing devices thereon are shown in the following patents described below:

U.S. Pat. No. 3,788,628 discloses a pneumatic spring-type system including a structure for anchoring the inner ends of a flexible rolling sleeve. The sleeve is positioned between surfaces characterized by having a saw-toothed shape with a circumferential groove and rib on an inner circumferential surface and two ribs on an outer circumferential surface. The opposite sides of the grooves converge at predefined angles with predetermined and matching radii of curvatures, the combination of which provides a gripping action to hold the flexible sleeve firmly in place by means of the saw-tooth design in cooperation with the matching recess of the ring and sleeve flange.

U.S. Pat. No. 3,870,286 relates to a fluid spring wherein the ends of the rolling sleeve are secured by annular clamping rings which engage against the internal surface of the sleeve. The clamping ring secures the rolling sleeve to the working cylinder with the clamping ring containing an annular groove type deformation by which the rolling sleeve is held in place by virtue of this interacting groove-shaped design in combination with the clamping force exerted by the ring.

U.S. Pat. No. 4,489,474 relates to means for connecting a tubular flexible member to a piston which includes a recess near the piston end which is secured to a flexible member. The flexible member is wrapped over and around a ring-shaped fitting which secures the flexible member to the piston. The piston comprises a circumferentially extending recess adjacent to its end with the flexible sleeve being positioned and substantially filling the recess of the piston.

The ring-shaped fitting is a conventional swaged ring and the end portion of the flexible member is trimmed from the portion extending from the piston ring with the flexible member substantially filling the recess of the shoulder of the piston. The piston employs a serrated edge to assist in griping of the flexible member.

U.S. Pat. No. 4,457,692 discloses an assembly for sealing two members, one of which has a cylindrical surface which supports the seal, wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,573,692 discloses an assembly for sealing two members, one of which has a cylindrical surface which supports the seal, wherein a sealing lip is provided to bear against the second member. A cylindrical surface supports the seal which comprises a hollow-cylindrical body having a lip which extends outwardly from the body with an elastomeric band circling the body to hold it firmly in place. The cylindrical surface contains a recess which extends circumferentially around the surface and receives a matching projecting element of the seal which extends from the inside diameter of the cylindrical body.

U.S. Pat. No. 4,629,170 relates to a pneumatic spring with a pair of chambers formed by a pair of membranes that are sealingly attached to an axially spaced-apart retainer and piston wherein the axial end of the membrane is compressed between a serrated surface of a solid member and a retaining ring wherein the ring may be swaged, fitted or otherwise tightened to produce radial compression against the axial ends of the flexible membranes.

British Patent No. 199,789 discloses a metal securing band which grips a diaphragm and forces it against a tapered end portion of a tubular member.

U.S. Pat. No. 4,718,650 shows an air spring in which the ends of the flexible sleeves are connected to the sealing surfaces of a pair of axially spaced pistons by swaged crimped clamping rings. The piston clamping surfaces are formed with serrations for assisting to retain the elastomeric material when forced therein by the clamping rings.

Some of the problems discussed above are solved by the clamping arrangement shown in U.S. Pat. Nos. 4,899,995 and 4,852,861. These patents show the use of a clamp ring having a single centrally located recess which aligns with an outwardly extending projection formed on the sealing surface of the piston and end member in order to position the clamping ring on the piston or end member. A pair of pinch areas are formed on opposite sides of the projection by outwardly extending annular rings or surfaces on the sealing surfaces of the piston and/or end member. These rings form the pinch areas or zones in cooperation with the axially extending inner annular surface of the clamp ring on opposite sides of the concave recess. Although this clamp ring assembly does solve some of the problems discussed above and is extremely efficient for many applications, especially for larger air springs having high internal pressure, it may not provide all of the desirable characteristics demanded by the industry including necessary clamping power, air-tight sealing, and economical production. A disadvantage of the clamping arrangement shown in these two patents is that the clamp rings require a more complicated configuration and, in particular, a recess formed in the center of the inside surface of the ring. This requires a more expensive ring to be utilized in the air spring. It is much cheaper to use a clamp ring in which the inner cylindrical surface is a continuously smooth surface free of recesses, yet achieving the desired clamping force.

SUMMARY OF THE INVENTION

Objectives of the invention include providing an improved end cap assembly for air actuators having end caps axially spaced at opposite ends with a flexible elastomeric sleeve extending therebetween and clamped against the respective end caps by a clamp ring to form a fluid tight seal therebetween and provide an intervening pressured chamber.

A further objective of the invention is to provide such an end cap assembly in which movement of the clamp ring is reduced when operating under dynamic conditions by positioning the ring directly against an annular flange of the end cap thereby maintaining a positive sealing effect with the elastomeric sleeve clamped between the ring and a sealing surface of the end cap.

A further objective of the invention is to provide such an improved end cap assembly in which the end cap clamping surface includes female or concave annular grooves separated by projections to facilitate efficient gripping of the elastomeric material therebetween and to alter the direction of the reinforcing cords contained within the elastomeric sleeve to further increase the clamping effect of the ring, and which construction positionally locates the clamp ring on the sealing surface of the end cap.

A further objective of the invention is to provide an improved end cap assembly on which a clamp ring is swaged to facilitate efficient gripping of the elastomeric material between the sealing surface on the end cap and the clamp ring.

A further objective of the invention is to provide an improved air actuator or spring that is designed to gravitate toward a sidewall burst rather than an end component or seal failure when over-pressure occurs within the fluid pressure chamber.

A further objective of the invention is to provide such an improved end cap assembly in which annular expansion grooves are formed between annular projections on the end cap sealing surfaces to permit the elastomeric material to flow therein.

A further objective of the invention is to provide deeper and more rubber flow into the grooves in the sealing surface on the end cap thereby providing improved sealing and clamping characteristics.

A further objective of the invention is to provide annular grooves designed to receive and hold the sleeve better than prior art designs.

A further objective of the invention is to provide specific groove configurations including at least one groove of a radiused design that is preferentially larger than prior art designs.

A further objective of the invention is to provide three distinct annular grooves of differing configurations and/or dimensions for supplying improved clamping.

A further major object of the invention is to provide a clamp ring having a continuous smooth internal cylindrical surface providing a less expensive than heretofore used clamp rings having recesses or configured inner surfaces.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
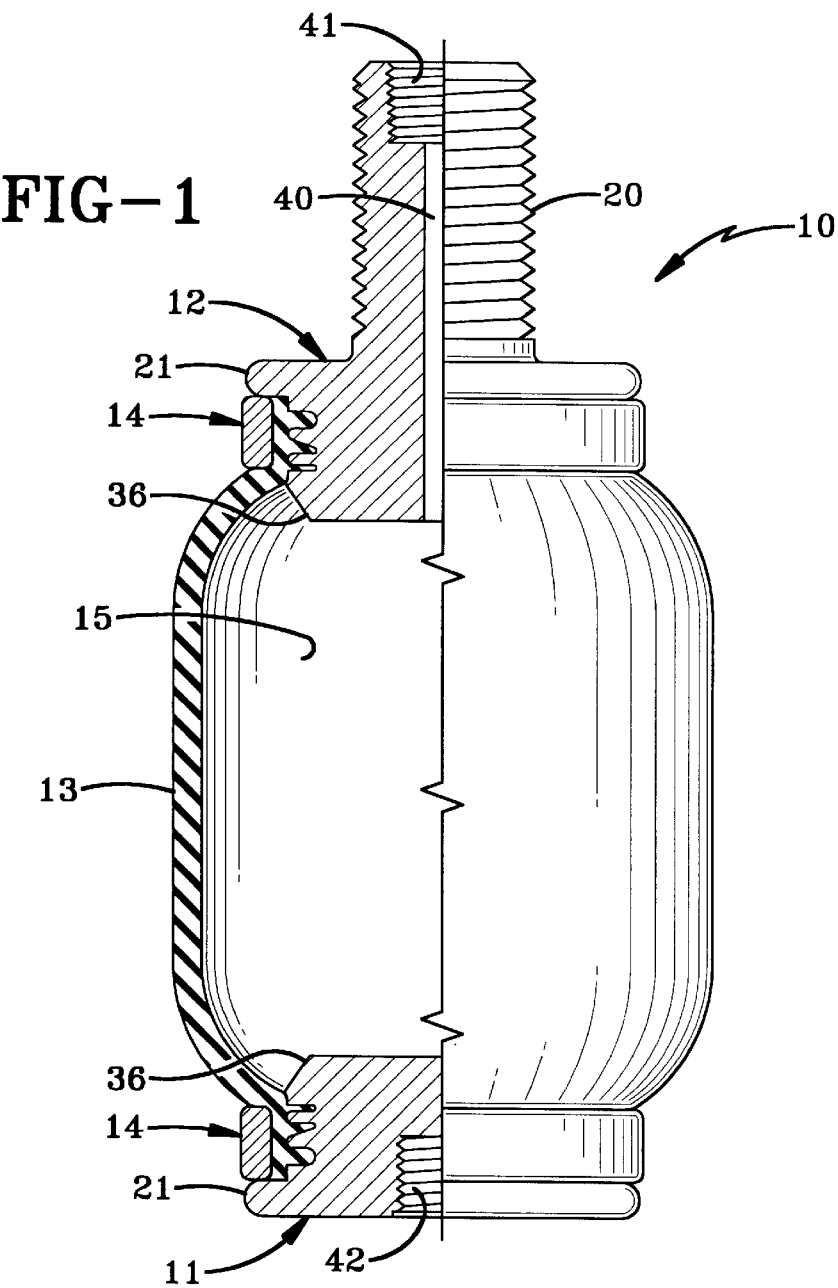
FIG. 1 is an elevational view of the improved end cap assembly incorporated into an air actuator with portions broken away and in section.

The improved end cap assembly of the invention is shown mounted on an air actuator indicated generally at 10 in FIG. 1. Air actuator 10 includes axially spaced end members consisting of two improved end caps indicated generally at 11 and 12, respectively. A flexible sleeve 13 of elastomeric material containing internal reinforcing cords extends between end caps 11 and 12 which are clampingly engaged within the open ends of the sleeve 13 by clamp rings 14. Once fully assembled, sleeve 13 and end caps 11 and 12 form an internal fluid pressure chamber 15 that is pressurizable with a compressed fluid via a fluid feed 40 such that increasing or decreasing the compressed fluid causes an increase or decrease in the distance between end caps 11 and 12 so as to actuate one or more of the objects connected thereto.

End caps 11 and 12 are of a substantially identical configuration except that one or more of the end caps, in this embodiment end cap 12, may include a threaded shaft 20 extending axially therefrom and some form of a fluid feed 40 therein. Due to this similarity in construction, the following description of end cap 12 will be equally applicable to end cap 11. End cap 12 includes an enlarged head 21, a base 23 and a neck 22 therebetween. Enlarged head 21 is a substantially flat and planar flange of a larger diameter than neck 22 or base 23. This extension of enlarged head 21 out from neck 22 defines an annular shoulder 24 against which the clamp ring 14 rests. Enlarged head further is a substantially planar flange with a rounded outer annular surface 25.

Neck 22 extends from the innermost point of shoulder 24 to base 23. The annular outer surface of neck 22 includes a plurality of annular grooves with a pair of annular projections extending therefrom. Specifically, neck 22 includes a large annular groove 30, a conical shaped annular groove 31, and a small annular groove 32. Each of these grooves extends inward from the outer annular surface of neck 22 as is most clearly shown in FIG. 3. A conicle-shaped projection 33 annularly extends outward in neck 22 between grooves 30 and 31, while a symmetrical rounded projection 34 annularly extends outward in between grooves 31 and 32.

Figure 2:
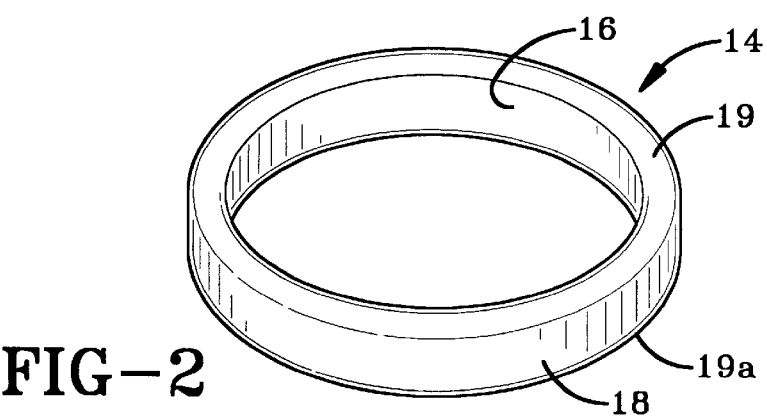
FIG. 2 is an enlarged perspective view of the clamp ring.
Figure 3:
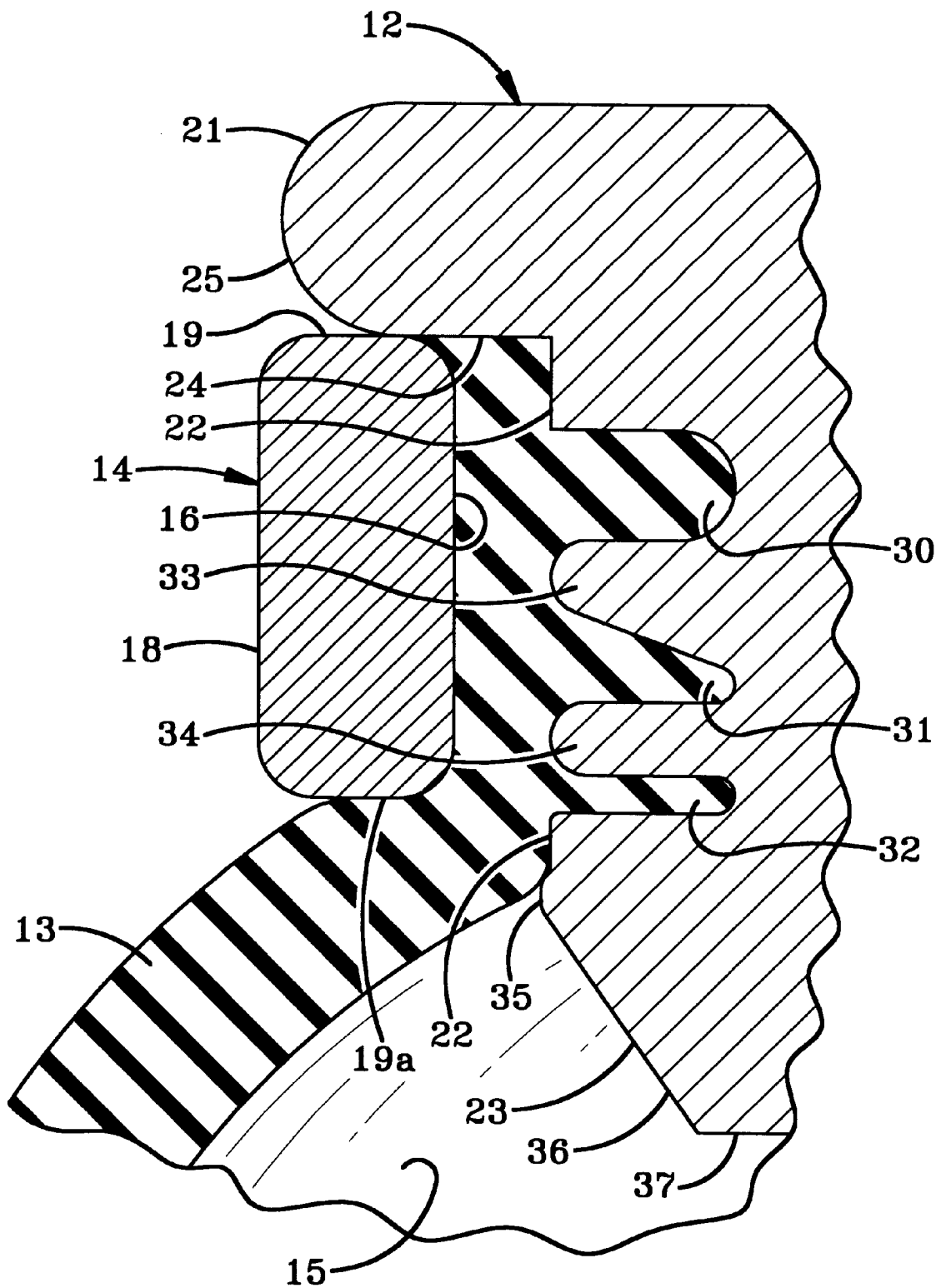
FIG. 3 is a greatly enlarged fragmentary sectional view showing a clamping ring securing one end of the elastomeric sleeve against the sealing surface of the improved end cap.

In a most preferred embodiment as is shown in FIGS. 1–3, large annular groove 30 is an annular indentation into neck 22 of a U-shaped cross section, when the cross section is radially taken. Similarly, small annular groove 32 is an annular indentation into neck 22 of a U-shaped cross section with a rounded base when the cross section is radially taken. The only difference between grooves 30 and 32 is groove 32 is of a smaller diameter. In each of these grooves, the depth of the groove is preferably greater than the width.

As to the conical annular groove, this groove 31 is an annular indentation in neck 22 of a V-shaped cross section when the cross section is radially taken where one side of the "V" is perpendicular to the central axis of the assembly 10 while the other side of the "V" is angled with respect to the central axis. Preferably, this angle is approximately 15° from the one side of the "V" that is perpendicular to the central axis.

Base 23 extends from neck 22 in a radially outward manner to define a lip 35. From lip 35, base 23 tapers axially inward along tapered surface 36 to bottom 37. In a most preferred embodiment, this taper is approximately 35°.

As is shown in FIG. 1, end cap 12 further includes threaded shaft 20 extending axially away from enlarged head 21 opposite neck 22. A fluid feed 40 extends axially through end cap 12 from bottom 37 to almost the end of threaded shaft 20 where fluid feed 40 terminates in a threaded bore 41. In contrast, end cap 11 does not include a fluid feed but does include a threaded bore 42. Threaded bores 41 and 42 are used to connect their respective end caps to objects to be moved in correlation to changes in fluid pressure. In addition, threaded bore 41 also supplies a fluid communication port to fluid feed 40.

Each of end caps 11 and 12 are preferably formed of a glass reinforced high-strength plastic material. In addition, one of the end caps may be provided with a solenoid control valve for regulating the fluid pressure within the air actuator, preferably along fluid feed 40.

Flexible sleeve 13 has a generally cylindrical configuration and is formed of an elastomeric material generally containing internal reinforcing cords which are trapped within one or two plies of an elastomer. The elastomeric material is of a sufficient flexibility such that the flexible sleeve 13 may roll around clamp rings 14 and over enlarged heads 21 during low compressed fluid levels where the objects connected to the end caps are moved in closer proximity to one another. It is for this reason that clamp rings 14 and end caps 11 and 12, particularly in enlarged heads 21, have rounded surfaces so as to not pinch or tear the elastomeric material of the flexible sleeve 13.

Clamp rings 14 are continuous rings preferably made of metal such as aluminum with rounded edges or corners. In accordance with one of the features of the invention, each clamp ring 14 will have a smooth continuous cylindrical inner surface 16 which joins with a smooth continuous outer cylindrical surface 18 by generally smooth, somewhat rounded edges or ends 19 and 19a.

In assembly, each end of the flexible sleeve 13 is sealingly clamped in a generally air tight relationship against neck surface 22 by the smooth inner surface 16 of sealing ring 14, which is then swaged or otherwise compressed and crimped to seal the sleeve end against neck surface 22. The result of this swaging is the forcing of the rubber sleeve 13 into grooves 30–32 so as to completely fill the grooves and compress the sleeve 13 in between inner surface 16 of clamp ring 14 and the end cap 11 or 12. The belts within the sleeve 13 are deformed and contoured by the grooves 30–32. As a result, knots of rubber sleeve with deformed belts therein are formed in grooves 30–32 which act to prevent the rubber from being pulled out of the grooves. This is particularly accentuated in the larger groove 30. In effect, the swaged ring supplies an air tight seal that is maintained even during a sleeve rupture or other failure which will only occur in the sidewall rather than the connection due to this improved design. The swaged design also allows higher pressures to be maintained within chamber 15 than were previously attainable with the prior art designs which did not have the swaged clamp ring around the three grooved end cap.

In use, end 19 of clamp ring 14 rests between shoulder 24 and the combination of lip 35 and the outwardly inflated flexible sleeve 13 as is clearly shown in FIG. 3. In this manner, clamp rings 14 cannot be removed without a release of the pressure within the fluid pressure chamber 15 such that the flexible sleeve 13 deflates and seats against or approximate tapered surface 36 such that clamp rings 14 can be axially removed inward over base 23 off of neck 22 on each end cap. In this manner, the ends of flexible sleeve 13 are pinched in between the smooth inner surface 16 of clamp ring 14 and neck 22 in an air-tight manner. Therefore, changes in fluid pressure within chamber 15 by the increase or decrease in the compressed fluid therein causes end caps 11 and 12 to be axially spaced further apart or closer together, respectively. This axially movement allows the movement of any objects connected to the end cap merely by the increase or decrease in compressed fluid within the chamber 15 via fluid feed 40. In this manner, air actuator 10 functions to control the space between objects attached to the end caps.

Although the above description describes throughout an air actuator, it is readily understood that the term "air actuator" includes air springs or similar pneumatic components.

Accordingly, the improved clamp ring assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the clamp ring assembly is constructed and used, the characteristics of the construction, and the advantageous, new and useful results obtained; the new and useful structures, devices, elements, arrangements, parts and combinations, are set forth in the appended claims.

We claim:

1. An air actuator including:

a pair of end caps adapted to be mounted at generally axially spaced locations;

a flexible sleeve formed of an elastomeric material and having a pair of open ends sealingly engaged with the end caps forming a fluid chamber therebetween;

an annular axially extending sealing surface formed on at least one of said end caps, said sealing surface being formed with a pair of axially spaced annular projections extending radially outwardly;

an annular clamp ring located concentrically with respect to the annular sealing surface of said one end cap for sealingly clamping one end of the flexible sleeve therebetween, said clamp ring having a smooth continuous cylindrical inner surface terminating in a pair of end edges;

at least three grooves being formed in the sealing surface of said one end cap by the pair of annular projections for receiving elastomeric material of the sleeve therein, one of said grooves being intermediate the pair of projections with the other two grooves being located on other sides of said projections, one of said projections being conical-shaped and the other of said projections having a symmetrical rounded configuration; and a radially outwardly extending annular shoulder formed at one end of the annular sealing surface of said one end cap for abutting the clamp ring to restrict movement of said clamp ring in the axial direction during operation of the air actuator.

2. The air actuator of claim 1 wherein the conical-shaped projection is located more proximate the annular shoulder than the other of said projections.

3. The air actuator of claim 1 wherein two of the grooves are U-shaped in cross section and another of said grooves is conical-shaped in cross section.

4. The air actuator of claim 3 wherein each of said U-shaped grooves has a depth and width; and in which one of said U-shaped grooves has a greater width than the other of said U-shaped grooves.

5. The air actuator of claim 4 wherein the depth of each of the U-shaped grooves is greater than the width thereof.

6. The air actuator of claim 5 wherein the U-shaped groove having the greater width is located more proximate to the annular shoulder than the other of said U-shaped grooves.

* * * * *